United States Patent
Peterson (10) Patent No.: US 8,902,174 B1
(45) Date of Patent: Dec. 2, 2014

(54) RESOLVING MULTIPLE PRESENCES OVER A TOUCH SENSOR ARRAY

(75) Inventor: Jonathan R. Peterson, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 935 days.

(21) Appl. No.: 12/396,374

(22) Filed: Mar. 2, 2009

Related U.S. Application Data (60) Provisional application No. 61/067,744, filed on Feb. 29, 2008.

(51) Int. Cl.
*G06F 3/044* (2006.01)

(52) U.S. Cl.
USPC ............. 345/173; 178/18.03; 178/18.06

(58) Field of Classification Search
CPC ............................ G06F 3/041; G06F 3/044
USPC ............................................. 178/18.03
See application file for complete search history.

(56) References Cited

U.S. PATENT DOCUMENTS

| | | | |
|---|---|---|---|
| 5,374,787 A * | 12/1994 | Miller et al. | 178/18.06 |
| 5,463,388 A | 10/1995 | Boie et al. | |
| 5,831,600 A | 11/1998 | Inoue et al. | |
| 6,297,811 B1 * | 10/2001 | Kent et al. | 345/173 |
| 6,621,487 B2 | 9/2003 | Iwasaki et al. | |
| 6,998,545 B2 * | 2/2006 | Harkcom et al. | 178/18.02 |
| 7,046,230 B2 | 5/2006 | Zadesky et al. | |
| 8,089,470 B1 | 1/2012 | Schediwy et al. | |
| 8,106,891 B2 | 1/2012 | Kong et al. | |
| 8,120,584 B2 | 2/2012 | Grivna et al. | |
| 2003/0206162 A1 | 11/2003 | Roberts | |
| 2003/0210235 A1 | 11/2003 | Roberts | |
| 2006/0097991 A1 * | 5/2006 | Hotelling et al. | 345/173 |
| 2007/0024597 A1 * | 2/2007 | Matsuoka | 345/173 |
| 2007/0109274 A1 * | 5/2007 | Reynolds | 345/173 |
| 2007/0229466 A1 | 10/2007 | Peng et al. | |
| 2008/0012835 A1 | 1/2008 | Rimon et al. | |
| 2008/0062140 A1 | 3/2008 | Hotelling et al. | |
| 2008/0158174 A1 | 7/2008 | Land et al. | |
| 2008/0179112 A1 | 7/2008 | Qin et al. | |
| 2008/0192018 A1 | 8/2008 | Park et al. | |
| 2008/0309629 A1 | 12/2008 | Westerman et al. | |
| 2009/0128516 A1 | 5/2009 | Rimon et al. | |
| 2009/0174675 A1 | 7/2009 | Gillespie et al. | |
| 2010/0156839 A1 | 6/2010 | Ellis | |
| 2010/0259504 A1 | 10/2010 | Doi et al. | |
| 2010/0289769 A1 | 11/2010 | Watanabe | |
| 2010/0321328 A1 | 12/2010 | Chang et al. | |
| 2011/0063249 A1 | 3/2011 | Chou et al. | |
| 2012/0013546 A1 | 1/2012 | Westhues et al. | |

OTHER PUBLICATIONS

CSR User Module, CSR v1.0, CY8C21x34 Data Sheet, Cypress Semiconductor Corporation, Oct. 6, 2005, pp. 1-36.
U.S. Appl. No. 12/395,304: "Multiple Touch Resolve" Robert Birch et al., filed on Feb. 27, 2009; 27 pages.

(Continued)

*Primary Examiner* — Quan-Zhen Wang
*Assistant Examiner* — David Lee
(74) *Attorney, Agent, or Firm* — Lowenstein Sandler LLP (57) ABSTRACT

An apparatus for and method of resolving multiple presences over a touch sensor are described. The method includes logically grouping data from a touch sensor array in order to convert the data into X-Y coordinates.

18 Claims, 7 Drawing Sheets

(56) References Cited

OTHER PUBLICATIONS

U.S. Appl. No. 12/455,413 "Multiple touch detection," Seok-Pyong Park et al., Filed on Jun. 1, 2009; 42 pages.
U.S. Appl. No. 13/217,147: "Contact Identification and Tracking on a Capacitance Sensing Array" Victor Kremin et al., filed on Aug. 24, 2011; 82 pages.
USPTO Advisory Action for U.S. Appl. No. 12/395,304 dated Mar. 9, 2012; 3 pages.
USPTO Advisory Action for U.S. Appl. No. 12/455,413 dated Jan. 6, 2014; 3 pages.
USPTO Advisory Action for U.S. Appl. No. 12/455,413 dated Nov. 5, 2012; 4 pages.
USPTO Advisory Action for U.S. Appl. No. 12/455,413 dated Dec. 13, 2012; 3 pages.
USPTO Final Rejection for U.S. Appl. No. 12/395,304 dated Jan. 4, 2012; 7 pages.
USPTO Final Rejection for U.S. Appl. No. 12/455,413 dated Sep. 5, 2012; 8 pages.
USPTO Final Rejection for U.S. Appl. No. 12/455,413 dated Oct. 30, 2013; 10 pages.
USPTO Final Rejection for U.S.Appl. No. 13/395,304 dated Jun. 6, 2013; 8 pages.
USPTO Non Final Rejection for U.S. Appl. No. 12/395,304 dated Jan. 16, 2013; 7 pages.
USPTO Non Final Rejection for U.S. Appl. No. 12/395,304 dated Aug. 5, 2011; 6 pages.
USPTO Non Final Rejection for U.S. Appl. No. 12/455,413 dated Feb. 21, 2014; 10 pages.
USPTO Non Final Rejection for U.S. Appl. No. 13/217,147 dated May 17, 2013; 14 pages.
USPTO Non-Final Rejection for U.S. Appl. No. 12/455,413 dated Jul. 3, 2013; 9 pages.
USPTO Notice of Allowance for U.S. Appl. No. 12/395,304 dated Aug. 30, 2013; 9 pages.
USPTO Notice of Allowance for U.S. Appl. No. 12/455,413 dated Jun. 9, 2014; 7 pages.
USPTO Notice of Allowance for U.S. Appl. No. 13/217,147 dated Nov. 18, 2013; 11 pages.
USPTO Preinterview First Office Action for U.S. Appl. No. 12/455,413 dated May 29, 2012; 2 pages.

\* cited by examiner

RESOLVING MULTIPLE PRESENCES OVER A TOUCH SENSOR ARRAY

REFERENCE TO RELATED APPLICATION

This application claims the benefit of U.S. Provisional Application No. 61/067,744 filed Feb. 29, 2008.

TECHNICAL FIELD

The present disclosure relates generally to touch sensor devices and, more particularly, to resolving multiple positions on a multi-touch sensor device.

BACKGROUND

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

One type of touchpad is composed of an array, or matrix, of sensor elements arranged in rows and columns. Within each row or column, there are multiple sensor elements. However, all sensor pads within each row or column are coupled together and operate as one long sensor element. The number of touches a touchpad can detect is not the same as the resolution of the touchpad. For example, even though current touchpads may have the capability to detect two substantially simultaneous touches with an XY array, current touchpads may not be able resolve the location of the two substantially simultaneous touches. One way to resolve the location of a second touch is if the touches arrive sequentially in time. This allows the remaining locations to be evaluated to determine which locations are "actual touch" locations and which are invalid touches, also referred to as "ghost touch" locations. If both touches arrive or are detected substantially simultaneously, there is no way to resolve which of the two pairs of potential locations constitute "actual" touches, instead of invalid touches (e.g., "ghost" touches). Thus, current two-axis touchpads are configured to resolve a location of a single touch. Similarly, current touch screens are designed to detect the presence and location of a single touch.

BRIEF DESCRIPTION OF THE DRAWINGS

Embodiments of the present invention are illustrated by way of example and not intended to be limited by the figures of the accompanying drawings in which like references indicate similar elements and in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that although embodiments may be described in regards to a "finger" touch, the term "touch" as used herein refers to the presence (i.e., in contact or close enough proximity for detection) of a conductive object (such as a finger or conductive stylus).

An apparatus for and method of resolving multiple touches on a touch sensor array are described. An embodiment of a capacitive sensing method capable of resolving multiple finger positions provides a capacitive "image" that uses processing is described. Embodiments of the method described below interpret the capacitive "image" data and logically groups and weighs the data in order to convert the image into X-Y coordinates. The method allows for simultaneous processing of data and capacitive sensing, since it resolves positions in a neighboring sensor element search (e.g., search above, search to the left, etc.) type of methodology. In one embodiment, such a method enables scan times to be longer without affecting position-report latency. In one embodiment, the capacitance sensor described herein senses a single sensor element ahead of the algorithm that implements the method described herein.

Figure 1:
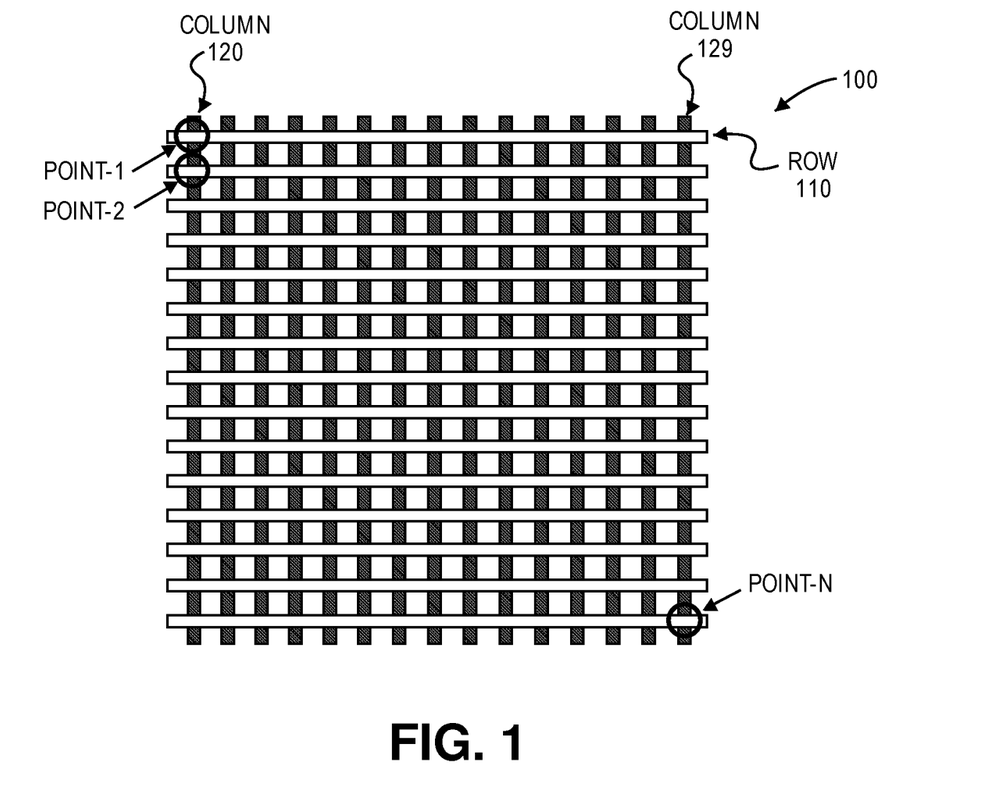
FIG. 1 illustrates one embodiment of a capacitive sensor array.

FIG. 1 conceptually illustrates one embodiment of a capacitive sensor array 100. Various apparatus for methods of capacitive sensing that are capable of multiple touch resolution of the capacitance at multiple junctions (e.g., Point-1, Point-2 and Point-n) between a row (e.g., row 110) and a column (e.g., columns 120 and 129) may be used. In addition, various known circuitry may be used to implement detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as discussed in further detail below.

Figure 2:
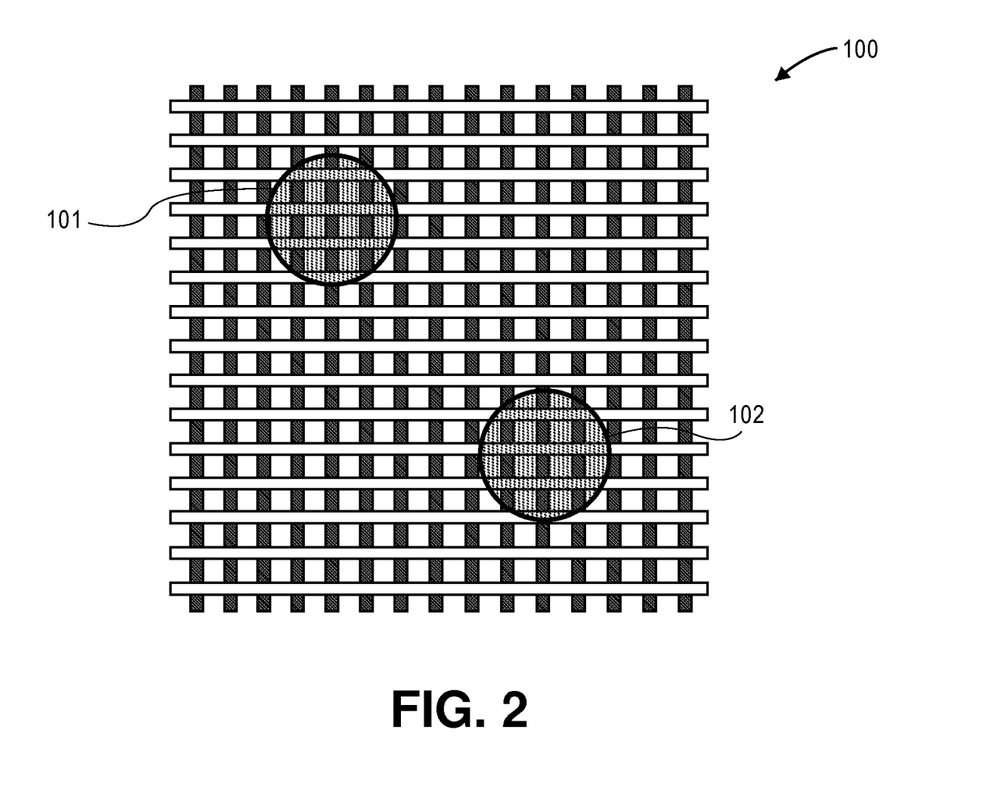
FIG. 2 illustrates one embodiment of a sensor array with two simultaneous finger touches present.
Figure 3:
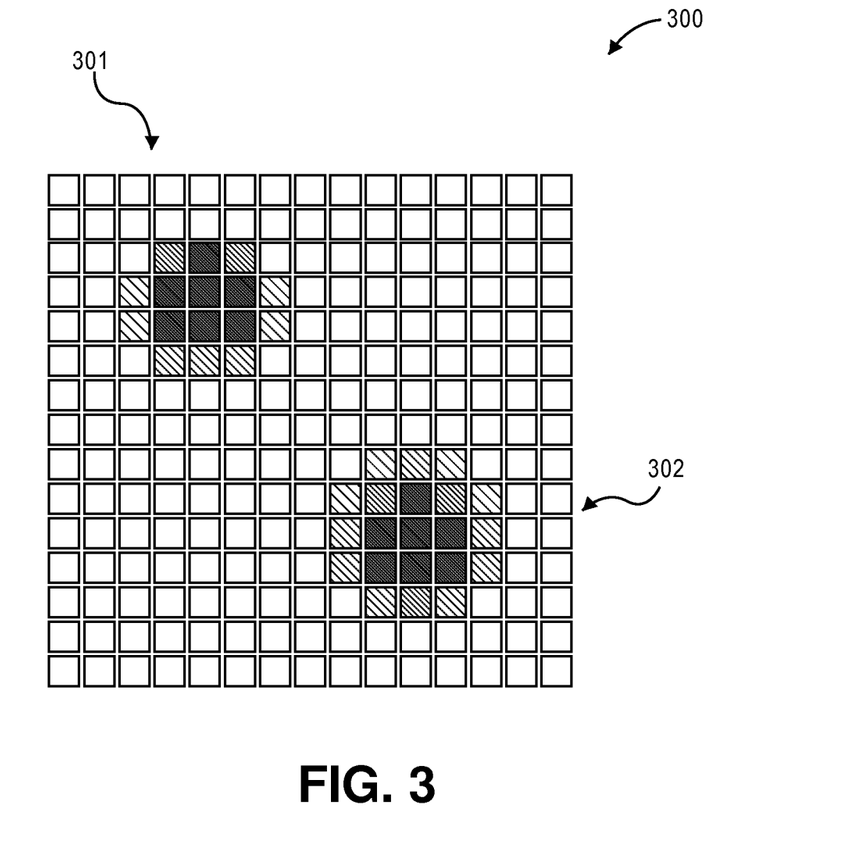
FIG. 3 illustrates the resulting capacitive image from the sensor array of FIG. 2.

FIG. 2 is a conceptual illustration of one embodiment of a sensor array 100 with two simultaneous fingers present (e.g., finger 101 and finger 102) and FIG. 3 illustrates the resulting capacitive image 300 in which the shaded sensor elements groupings 301 and 302 are active sensor elements resulting from contact with fingers 101 and 102, respectively. This image 300 is created by the capacitance measurement at each junction of the rows and columns of the sensor array 100. The darker, more heavily, shaded areas have higher capacitive measurements associated with them, than the lighter, lesser shaded areas. Once a capacitive image 300 is acquired, the image 300 is processed in order to determine exact X-Y locations of the fingers 101 and 102.

Figure 4:
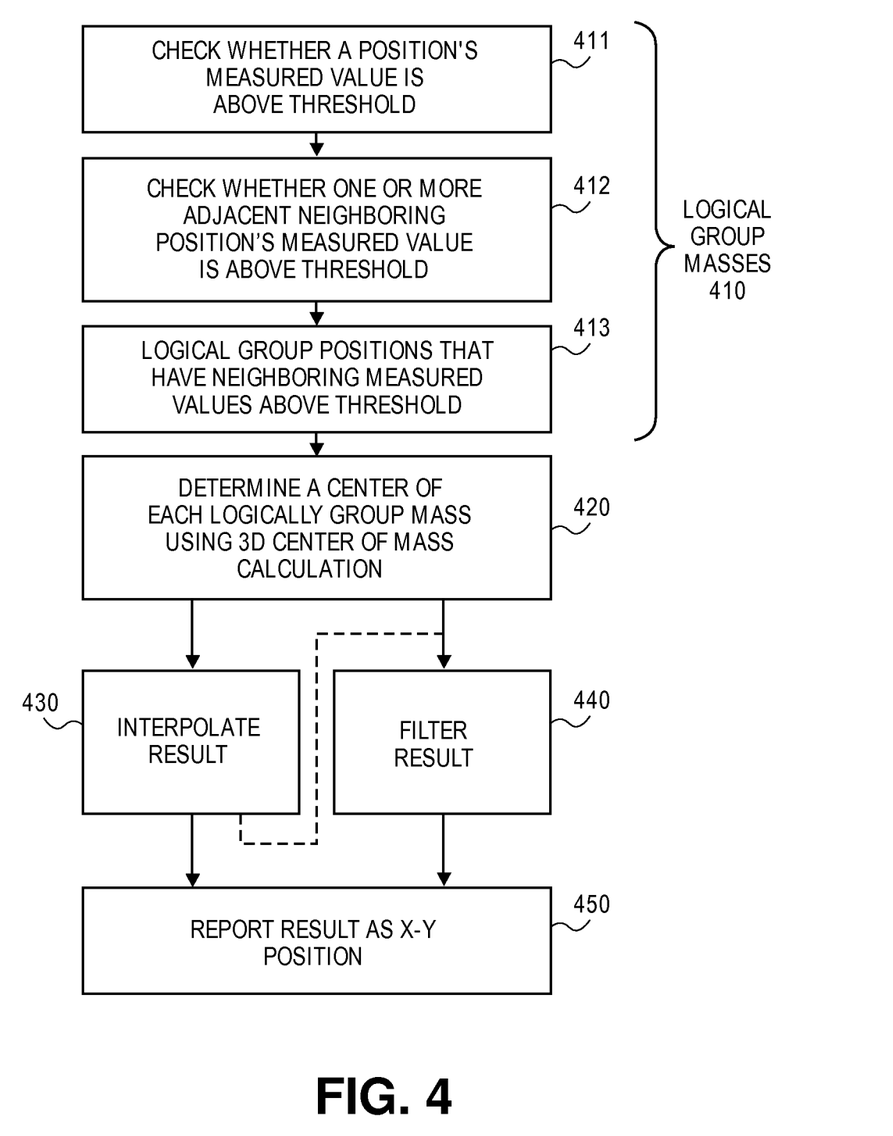
FIG. 4 illustrates a method of resolving multiple simultaneous touches on a touch sensor array, according to one embodiment of the present invention.
Figure 5:
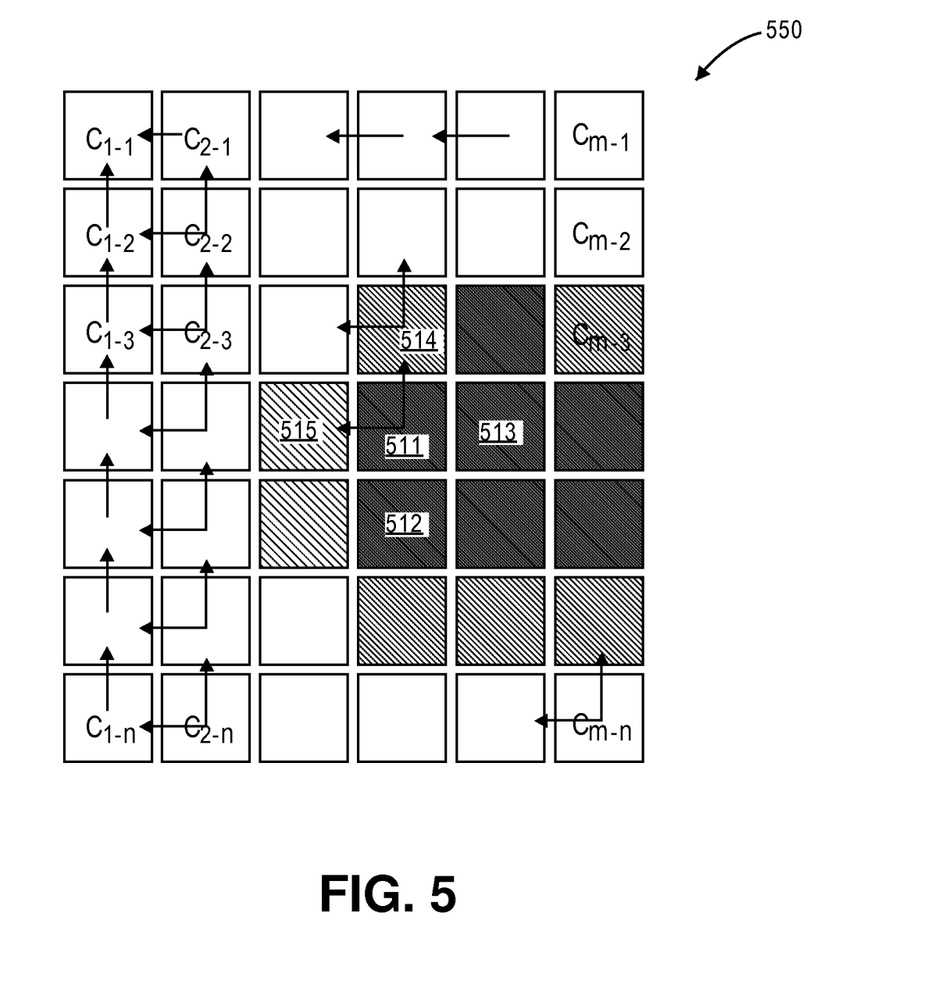
FIG. 5 shows a zoomed-in view of an order that each position of the sensor array is checked, according to one embodiment of the present invention.

FIG. 4 illustrates a method of resolving multiple simultaneous touches on a touch sensor array, according to one embodiment of the present invention. Reference is also made to the conceptual illustration of FIG. 5 in discussing the method of FIG. 4. In one embodiment, the active sensor element positions 301 and 302 sensed on the sensor array 100 are logically grouped into masses, operation 410. In doing so, each sensor element position is checked to determine if a measured capacitance value for the sensor position it is above a predetermined threshold (e.g., noise or presence), operation 411. FIG. 5 shows a zoomed-in view of the order each position is checked, according to one embodiment of the present invention. FIG. 5 includes a subset 550 of positions of the capacitive image 300 in an area around one of the active sensor elements groups. The subset 350 includes the capacitive measurements (C) of m rows and n columns ($C_{1-1}$ to $C_{m-n}$) of junctions of the rows and columns of the sensor array 100. For example, a first position, i.e., junction position, (511) is checked to determine if the measured value is above a threshold, operation 411. A next neighboring position (e.g., 512) is checked in the same way. An adjacent position (e.g., 513) may also be checked to see if it is active. In one embodiment, if an adjacent position (e.g., 513) is determined to be above the threshold, the position above (e.g., 514) and the position to the left (515) of the current position (511) are also checked, where applicable (i.e., if not on a top row or left most column), to determine if they are above the threshold as well, operation 412. Alternatively, the sensor array positions may be checked in other orders and other positions neighboring a current position may be checked to determine if those positions are above the threshold (e.g., below and/or right).

Figure 6:
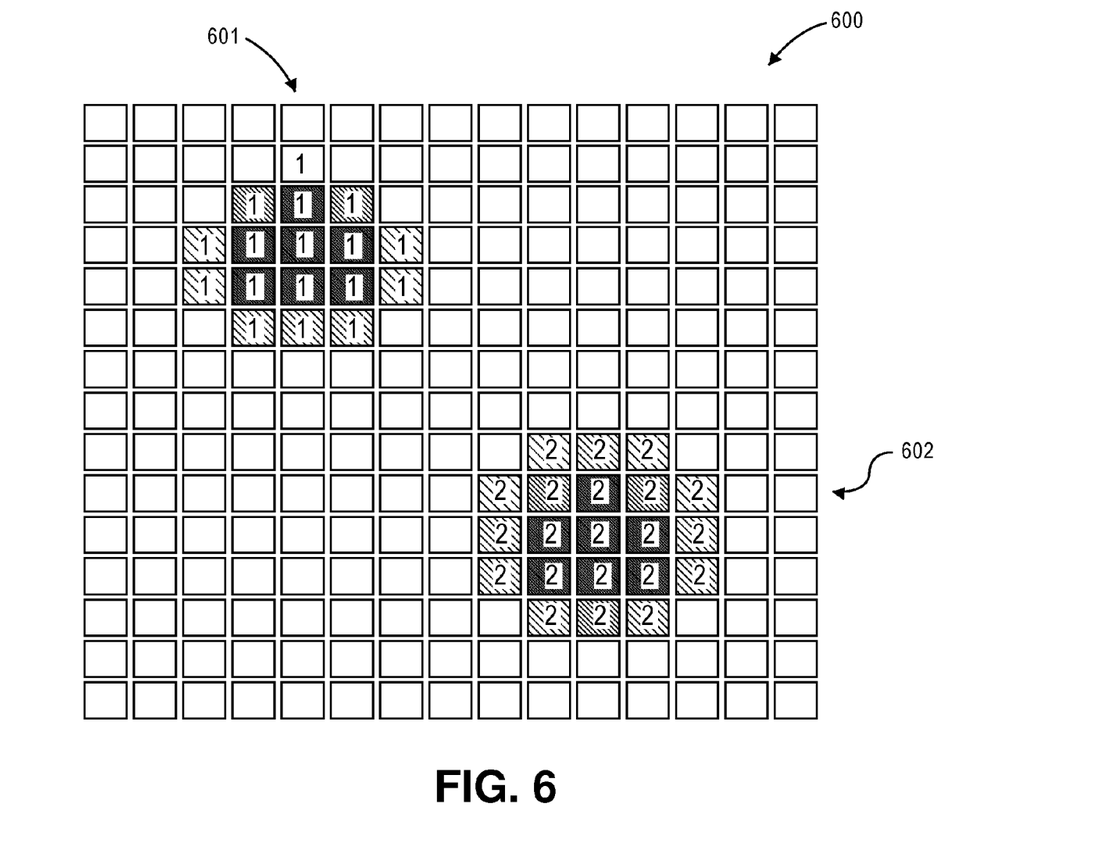
FIG. 6 illustrates an example of resulting resolved positions from the method according to an embodiment of present invention.

FIG. 6 illustrates an example of resulting resolved position groupings from the method of FIG. 4. Although there may be multiple masses (e.g., three or more), in this example, there are two masses of neighboring positions that are above the threshold: one group mass 601 near the upper left of the sensor array image 600 and the other group mass 602 near the lower right of sensor array image 600. After each mass has been grouped, each group mass is assigned a number so that each position may be referenced. In the example shown in FIG. 5, the group mass 601 near the upper left hand corner of sensory array image 600 is assigned the reference number 1 and the group mass 602 near the lower right hand corner of sensory array image 600 is assigned the reference number 2.

Referring again to FIG. 4, in one embodiment, each grouped mass is then processed to determine its center using a three-dimensional (3D) center-of-mass calculation, operation 420. In one embodiment, a 3D center of mass calculation operates as follows:

Each square (shown in FIG. 6) indicated with a shading is multiplied by a number. The number corresponds to its row and column. For example, assuming the following values are measured (corresponding to the top-left group mass 601 shown in FIG. 6):

[00, 00, 15, 00, 00]
[00, 20, 25, 20, 00]
[30, 35, 40, 35, 30]
[27, 32, 35, 32, 27]
[00, 15, 15, 15, 00]

These values are multiplied in the following way (based on the rows and columns shown in FIGS. 1 and 2). The following numbers correspond to the column (X) position:

[(00 * 2), (00 * 3), (15 * 4), (00 * 5), (00 * 6)] ← Row 1, Col 2, 3, 4, 5, 6
[(00 * 2), (20 * 3), (25 * 4), (20 * 5), (00 * 6)] ← Row 2, Col 2, 3, 4, 5, 6
[(30 * 2), (35 * 3), (40 * 4), (35 * 5), (30 * 6)] ← Row 3, Col 2, 3, 4, 5, 6
[(27 * 2), (32 * 3), (35 * 4), (32 * 5), (27 * 6)] ← Row 4, Col 2, 3, 4, 5, 6
[(00 * 2), (15 * 3), (15 * 4), (15 * 5), (00 * 6)] ← Row 5, Col 2, 3, 4, 5, 6

The following numbers correspond to the row (Y) position:

[(00 * 1), (00 * 1), (15 * 1), (00 * 1), (00 * 1)] ← Row 1, Col 2, 3, 4, 5, 6
[(00 * 2), (20 * 2), (25 * 2), (20 * 2), (00 * 2)] ← Row 2, Col 2, 3, 4, 5, 6
[(30 * 3), (35 * 3), (40 * 3), (35 * 3), (30 * 3)] ← Row 3, Col 2, 3, 4, 5, 6
[(27 * 4), (32 * 4), (35 * 4), (32 * 4), (27 * 4)] ← Row 4, Col 2, 3, 4, 5, 6
[(00 * 5), (15 * 5), (15 * 5), (15 * 5), (00 * 5)] ← Row 5, Col 2, 3, 4, 5, 6

A total mass is then calculated as follows:

[00, 00, 15, 00, 00]
[00, 20, 25, 20, 00]
[30, 35, 40, 35, 30]
[27, 32, 35, 32, 27]
[00, 15, 15, 15, 00]
Total Mass = 00 + 00 + 15 +
00 + 00 + 00 + 20 + 25 + 20 +
00 + 30 + 35 + 40 + 35 + 30 +
27 + 32 + 35 + 32 + 27 +
00 + 15 + 15 + 15 + 00
Total Mass = 448

The new matrixes that have been adjusted for position are then divided by the total mass. For example, the X position is found by:

[(00 * 2), (00 * 3), (15 * 4), (00 * 5), (00 * 6)]
[(00 * 2), (20 * 3), (25 * 4), (20 * 5), (00 * 6)]
[(30 * 2), (35 * 3), (40 * 4), (35 * 5), (30 * 6)]
[(27 * 2), (32 * 3), (35 * 4), (32 * 5), (27 * 6)]
[(00 * 2), (15 * 3), (15 * 4), (15 * 5), (00 * 6)]

Which equals:
[00, 00, 60, 00, 00]
[00, 60, 100, 100, 00]
[60, 105, 160, 175, 180]
[54, 96, 140, 160, 162]
[00, 45, 60, 75, 00]

The total mass of the adjusted matrix is found (similar to finding the total mass above):

TotalXMass = 00 + 00 + 60 +
00 + 00 + 00 + 60 + 100 + 100 +
00 + 60 + 105 + 160 + 175 + 180 +
54 + 96 + 140 + 160 + 162 +
00 + 45 + 60 + 75 + 00
TotalXMass = 1792

The total mass for the Y-Direction is found in a similar way.

In this example, the total mass for the Y-Direction is found to be: 1492

The TotalXMass and TotalYMass are then divided by the total mass:

X-Position=TotalXMass/TotalMass

X-Position=1792/448→4

Y-Position=TotalYMass/TotalMass

Y-Position=1492/448→3.33

In this example, the 0,0 position has been chosen to be at the upper left portion of FIG. 3. It can be seen from an inspection of FIG. 3 that a position of (4, 3.33) is approximately at the center of the shaded mass. Each position in each mass is assigned a weight depending on its position for this calculation. In one embodiment, each grouped mass has an X-dimension (e.g., width) value; Y-dimension (e.g., height) value and sensed (e.g., capacitance) measurement (e.g., depth/amplitude) value.

It should also be noted that the depth/amplitude value could be derived from any number of different measurements, and is not limited to a capacitance measurement. Accordingly, the method described above may be used with sensing methods that are not capacitive sensing based. For example, these methods might include, but are not limited to, measurement of an array of phototransistors or an array of force-sensitive resistors. Accordingly, the array of sensors should not be construed to be limited to capacitive sensors.

In one embodiment, the method includes interpolating the result of the 3D center of mass calculation, operation 430. The interpolated result may then be filtered, operation 440. Alternatively, the interpolated result may be reported (e.g., to host 250 of FIG. 7) as an X-Y position of the sensor array 100, operation 450, without filtering. In another embodiment, the result of the 3D center of mass calculation may be filtered without interpolation and then reported (e.g., to host 250 of FIG. 7) as an X-Y position of the sensor array 100, operation 450. It should be noted that alternative embodiments may utilize other center of mass calculations provided above.

A feature of an embodiment of the method described herein is that it is capable of resolving positions in substantially parallel with capacitive sensing. Since the two tasks can be done substantially in parallel, slightly longer scan times can be used without sacrificing finger-report latency.

Figure 7:
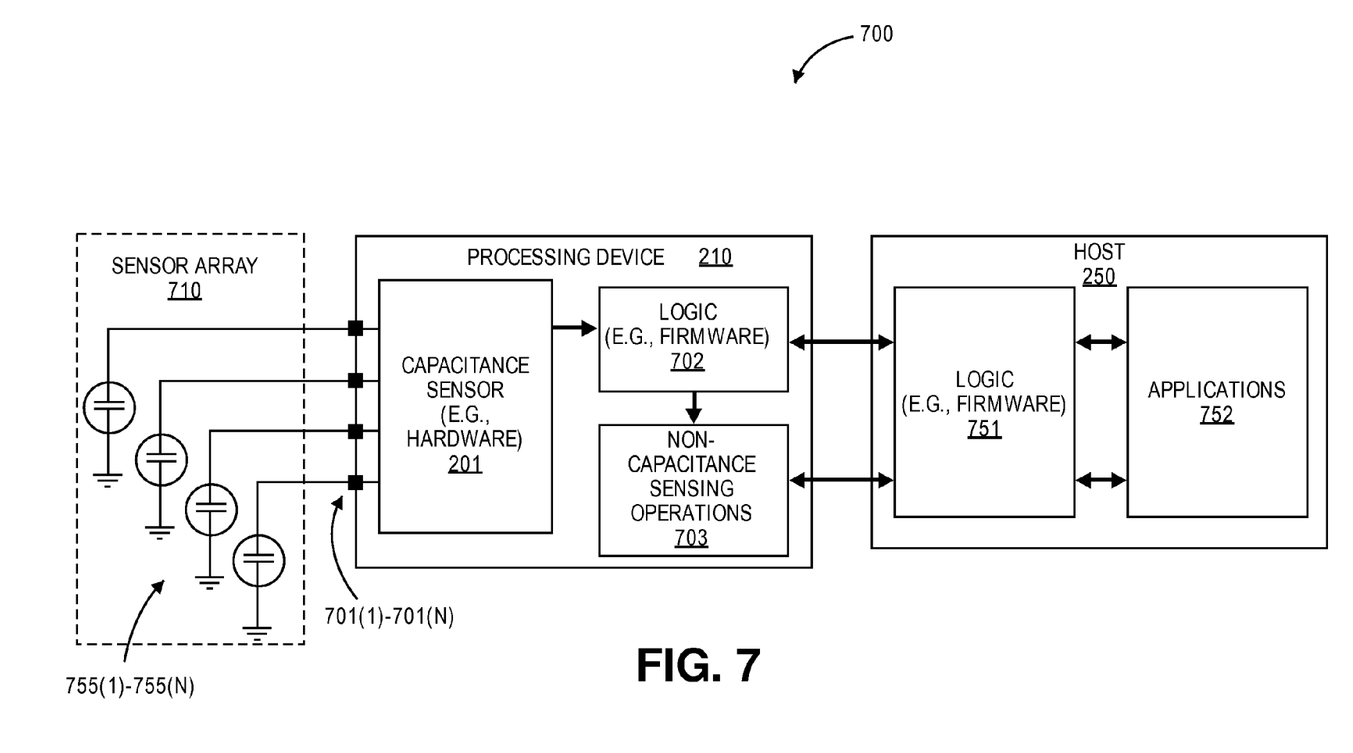
FIG. 7 is a block diagram illustrating one embodiment of an electronic device including a processing device that includes a capacitance sensor for measuring the capacitance on a sensor array and logic implementing embodiments of the present invention.

FIG. 7 is a block diagram illustrating one embodiment of an electronic device including a processing device that includes a capacitance sensor for measuring the capacitance on a sensor array and logic implementing embodiments of the present invention. The electronic device 700 includes the sensor array 710, processing device 210, and host 250. The sensor array 710 may be a single set of sensor elements that are disposed in at least one dimension of the touch-sensor device. The sensor array 710 is coupled to pins 701(1)-701(N) of the processing device 210. Each sensor element is represented as a capacitor. Sensor array 710 includes sensor elements 755(1)-755(N), where N is a positive integer value that represents the number of sensor elements of the sensor array 710. Although four sensor elements 755(1)-755(N) are illustrated (N=4), the set of sensor elements may include more or less sensor elements than four. In one embodiment, the capacitance sensor 201 may include a selection circuit (not illustrated). The selection circuit is coupled to the sensor elements 755(1)-755(N) and the sensing circuitry of the capacitance sensor 201. The selection circuit may be used to select which of the multiple sensor elements to provide the charge current and to measure the capacitance of each sensor element.

The processing device 210 further includes a logic block 402 to implement embodiments of the method described above. The operations of logic block 702 may be implemented in firmware; alternatively, it may be implemented in hardware or software. Processing device 210 may also include hardware or firmware for performing non-capacitance sensing actions 703. Alternatively, instead of performing the operations of the logic 702 in the processing device 210, the processing device 201 may send the raw data to the host 250 for operation by logic 751. The operations of logic 751 may also be implemented in firmware, hardware, and/or software. Also, as described above, the host may include high-level APIs in applications 752 that perform routines on the received data, such as compensating for sensitivity differences, other compensation algorithms, baseline update routines, start-up and/or initialization routines, interpolation operations, scaling operations, or the like. The operations described with respect to the logic 702 may be implemented in logic 751, applications 752, or in other hardware, software, and/or firmware external to the processing device 210.

Various known circuitry may be used to implement capacitance sensor 201 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as mentioned above. A processing device having a capacitance sensor can be obtained from Cypress Semiconductor Corporation. Alternatively, processing devices having capacitance sensors may be obtained from other companies.

It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art.

It will be evident that various modifications and changes may be made to these embodiments. Accordingly, the specification and drawings are to be regarded in an illustrative rather than a restrictive sense.

What is claimed is:

1. A method of resolving multiple substantially simultaneous presences over a touch sensor array, comprising:
    measuring a plurality of sensor elements of the touch sensor array to determine a corresponding plurality of measured values;
    determining whether a first measured value of a first sensor element, of the plurality of sensor elements, is above a threshold;
    responsive to determining that the first measured value of the first sensor element is above the threshold, determining whether a second measured value of a second sensor element, of the plurality of sensor elements, is above the threshold;
    grouping the sensor elements that neighbor one another, and have measured values above the threshold, into a plurality of grouped masses, wherein each of the plurality of grouped masses includes three or more neighboring sensor elements; and determining, using a processing device, a center of each of the plurality of grouped masses by performing a three-dimensional center of mass calculation, wherein at least a portion of the three-dimensional center of mass calculation is performed while at least a portion of the plurality of the sensor elements is measured, wherein the center of each grouped mass is defined by a single x-dimension value derived from a plurality of x-dimension values of positions of the grouped mass, a single y-dimension value derived from a plurality of y-dimension values of the positions of the grouped mass, and a single z-dimension value derived from a plurality of z-dimension values of the positions of the grouped mass.

2. The method of claim 1, further comprising:
interpolating the center to generate an interpolated result; and
reporting the interpolated result as an X-Y position of the touch sensor array.

3. The method of claim 2, further comprising:
filtering the center to generate a filtered result; and
reporting the filtered result as an X-Y position of the touch sensor array.

4. The method of claim 1, further comprising:
filtering the center to generate a filtered result; and
reporting the filtered result as an X-Y position of the touch sensor array.

5. The method of claim 1, wherein in performing the three dimensional center of mass calculation, each sensor element in each grouped mass is assigned a weight.

6. The method of claim 5, further comprising:
interpolating a result of the three dimensional center of mass calculation to generate an interpolated result; and
reporting the interpolated result as an X-Y position of the touch sensor array.

7. The method of claim 5, further comprising:
filtering a result of the three dimensional center of mass calculation to generate a filtered result; and
reporting the filtered result as an X-Y position of the touch sensor array.

8. The method of claim 1, wherein the single z-dimension value is a sense measurement value.

9. The method of claim 1, wherein the single z-dimension value is an amplitude value.

10. The method of claim 1, wherein the threshold is based on a noise value.

11. An apparatus to resolve multiple substantially simultaneous presences over a touch sensor array, comprising:
a processing device configured to measure a plurality of sensor elements of the touch sensor array to determine a corresponding plurality of measured values; and
responsive to determining that a first measured value of a first sensor element, of the plurality of sensor elements, is above a threshold; determine whether a second measured value of a second sensor element, of the plurality of sensor elements, is above the threshold, the processing device configured to group the sensor elements that neighbor one another and have measured values above the threshold into a plurality of grouped masses, and determine a center of each of the plurality of grouped masses using a three-dimensional center of mass calculation, wherein each of the plurality of grouped masses includes three or more neighboring sensor elements, and wherein the processing device is configured to perform at least a portion of the three-dimensional center of mass calculation while the processing device measures at least a portion of the plurality of the sensor elements, wherein the center of each grouped mass is defined by a single x-dimension value derived from a plurality of x-dimension values of positions of the grouped mass, a single y-dimension value derived from a plurality of y-dimension values of the positions of the grouped mass, and a single z-dimension value derived from a plurality of z-dimension values of the positions of the grouped mass.

12. The apparatus of claim 11, wherein the processing device is further configured to interpolate the center to generate an interpolated result, and to report the interpolated result as an X-Y position of the touch sensor array.

13. The apparatus of claim 11, wherein the processing device is further configured to filter the center to generate a filtered result, and report the filtered result as an X-Y position of the touch sensor array.

14. The apparatus of claim 11, wherein in performing the three dimensional center of mass calculation, the processing device is configured to assign a weight to each sensor element in each grouped mass.

15. The apparatus of claim 14, wherein the processing device is further configured to:
interpolate a result of the three dimensional center of mass calculation to generate an interpolated result,
filter the interpolated result of the three dimensional center of mass calculation to generate a filtered result, and
report the filtered result as an X-Y position of the touch sensor array.

16. The apparatus of claim 11, wherein the single z-dimension value is an amplitude value.

17. The apparatus of claim 11, further comprising the sensor array coupled to the processing device.

18. The apparatus of claim 11, wherein the threshold is based on a noise value.

* * * * *